United States Patent
Tomiyasu et al.

(10) Patent No.: US 8,018,864 B2
(45) Date of Patent: Sep. 13, 2011

(54) RELAY DEVICE AND COMMUNICATION-PATH MANAGING METHOD

(75) Inventors: Manabu Tomiyasu, Fukuoka (JP); Katsunori Mawatari, Fukuoka (JP); Daisuke Kobayashi, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 136 days.

(21) Appl. No.: 11/874,312

(22) Filed: Oct. 18, 2007

(65) Prior Publication Data

US 2008/0144629 A1 Jun. 19, 2008

(30) Foreign Application Priority Data

Dec. 14, 2006 (JP) ................................. 2006-337324

(51) Int. Cl.
*G06F 11/00* (2006.01)
(52) U.S. Cl. .......................... 370/252; 370/216; 370/243
(58) Field of Classification Search .................. 370/468, 370/519, 392, 216, 243, 252
See application file for complete search history.

(56) References Cited

U.S. PATENT DOCUMENTS

| | | | | |
|---|---|---|---|---|
| 6,434,117 B1 * | 8/2002 | Momona | ....................... | 370/236 |
| 2002/0057714 A1 * | 5/2002 | Takeda et al. | ................. | 370/468 |

FOREIGN PATENT DOCUMENTS

| | | |
|---|---|---|
| JP | 01-223854 | 9/1989 |
| JP | 06-097955 | 4/1994 |
| JP | 2004-23120 | 1/2004 |
| JP | 2006-211263 | 8/2006 |

OTHER PUBLICATIONS

"Japanese Office Action" mailed by JPO and corresponding to Japanese application No. 2006-337324 on Mar. 1, 2011, with English translation.

* cited by examiner

*Primary Examiner* — Jason Mattis
(74) *Attorney, Agent, or Firm* — Fujitsu Patent Center

(57) ABSTRACT

A check-frame receiving unit receives a check frame containing bandwidth data of a bandwidth allocated to a communication between a transmitting side and a receiving side. A bandwidth-data extracting unit extracts bandwidth data in the check frame and outputs a received bandwidth with a MAC address in the check frame. A bandwidth comparing unit reads out preset bandwidth set in association with a destination MAC address from a bandwidth storing unit, and compares the received bandwidth with the preset bandwidth. A response-frame generating unit generates a response frame containing a result obtained by comparing the received bandwidth with the preset bandwidth, the received bandwidth, and the preset bandwidth. A response-frame transmitting unit transmits the response frame generated by the response-frame generating unit.

12 Claims, 12 Drawing Sheets

| DESTINATION ADDRESS | SOURCE ADDRESS | VWAN DATA | TTL | MAC ADDRESS | BANDWIDTH DATA | FCS |

RELAY DEVICE AND COMMUNICATION-PATH MANAGING METHOD

BACKGROUND OF THE INVENTION

1. Field of the Invention

The present invention relates to a technology for relaying a communication between a transmitting side and a receiving side.

2. Description of the Related Art

Recently, an Internet protocol (IP) network is broadly in use, in which data transmitted from a transmitting side is relayed to a receiving side by a plurality of relay devices (such as a router and a switch). In such communication network, network reachability between the transmitting side and the receiving side is often checked using a program called packet Internet groper (ping) or the like. Specifically, the transmitting side transmits predetermined small-sized data to the receiving side, so that the transmitting side can check the network reachability based on a response from the receiving side to the transmitted data.

To manage the relay devices in an efficient manner, a technology is disclosed in Japanese Patent Application Laid-Open No. 2004-23120. In the above technology, if a transmitting device issues an instruction for starting a check in a network called a virtual local area network (VLAN), a single relay device (a route node) transmits a test packet to collect VLAN set data as a response packet from other relay devices in the same network. As a result, it is possible to improve an efficiency of a management of the relay devices.

For a maintenance and a management of such network, a technology is further developed, in which a monitoring server provided for each network collects state data defined as management information base (MIB) of a device. With this technology, it is possible to efficiently manage a network configuration and an operation state of the relay device provided between the transmitting device and the receiving device, as well as to check the network reachability.

However, with the above technologies, a cause of a degradation of the throughput can be hardly identified when a desired throughput cannot be obtained even with the network between the transmitting device and the receiving device in a reachable state. In other words, if a communication bandwidth for a relay device is narrowed due to an erroneous setting in the relay device, the communication bandwidths between the relay device and other relay devices become inconsistent, so that an expected throughput cannot be obtained in the receiving device. In this case, an error cannot be detected, because a user can confirm that the network is in a reachable state, and network configuration data or the like can be transmitted and received between the transmitting device and the receiving device. Therefore, it is problematic that a desired throughput appropriate for a subscription fee may not be provided to the user in a communication service that charges the user depending on a bandwidth.

Furthermore, even when it is detected that the desired throughput is not being provided in the receiving device, a cause of a degradation of the throughput can be hardly identified because there are a number of relay devices involved. In other words, it is difficult to identify a relay device or a network line having an erroneous setting or a failure.

If the state data of each of the relay devices is collected using the MIB described above, it is possible to identify a cause of the degradation of the throughput. However, because the MIB is not sufficiently standardized, it is necessary to provide a monitoring server compliant to each of the relay devices if the relay devices are provided by different service providers. Accordingly, it is difficult to control and manage all the relay devices provided in the network when the transmitting device and the receiving device belong to different networks, respectively.

SUMMARY OF THE INVENTION

It is an object of the present invention to at least partially solve the problems in the conventional technology.

An apparatus according to one aspect of the present invention that relays a communication between a transmitting device and a receiving device, includes a receiving unit that receives a first frame containing a first bandwidth allocated to the communication, an acquiring unit that acquires the first bandwidth from the first frame received by the receiving unit, a comparing unit that compares the first bandwidth acquired by the acquiring unit with a second bandwidth previously set in the apparatus to output a first comparison result, a generating unit that generates a second frame containing the first comparison result output from the comparing unit; and a transmitting unit that transmits the second frame generated by the generating unit.

An communication-path managing method according to one aspect of the present invention for an apparatus that relays a communication between a transmitting device and a receiving device, includes receiving a first frame containing a first bandwidth allocated to the communication, acquiring the first bandwidth from the first frame received at the receiving, comparing the first bandwidth acquired at the acquiring with a second bandwidth previously set in the apparatus to output a first comparison result, generating a second frame containing the first comparison result output from the comparing, and transmitting the second frame generated.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings. A network related to a virtual wide area network (VWAN) is described as an example according to the embodiments. However, the present invention can be applied to other communication system as long as the other communication system takes a scheme in which data is relayed between a transmitting side and a receiving side. Although the example depicts a case in which a relay device checks a bandwidth consistency according to the embodiments, it is possible for a receiving device that does not have a function of relaying data, checks the bandwidth consistency.

Figure 1:
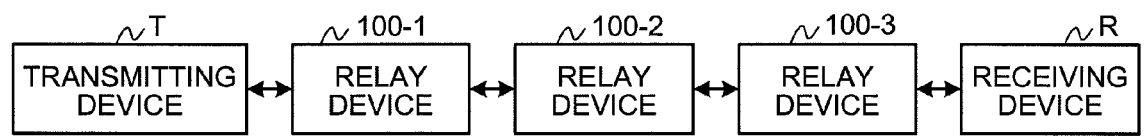
FIG. 1 is a schematic diagram for explaining a concept of a communication system according to a first embodiment of the present invention.

FIG. 1 is a schematic diagram for explaining a concept of a communication system according to a first embodiment of the present invention. As shown in FIG. 1, three relay devices 100-1 to 100-3 are provided between a transmitting device T and a receiving device R. Accordingly, when data frame containing normal data is transmitted from the transmitting device T, the data frame is transmitted to the receiving device R via each of the relay devices 100-1 to 100-3.

A check frame for performing a check of a transmission path is transmitted from the transmitting device T. Each of the relay devices 100-1 to 100-3 receives the check frame to relay the check frame, and generates a response frame to return the response frame to the transmitting device T. In this case, each of the relay devices 100-1 to 100-3 compares a bandwidth set in each of the relay devices 100-1 to 100-3 with a bandwidth stored in the check frame, and stores bandwidth comparison data indicating whether the bandwidths are consistent in the response frame.

Figure 2:
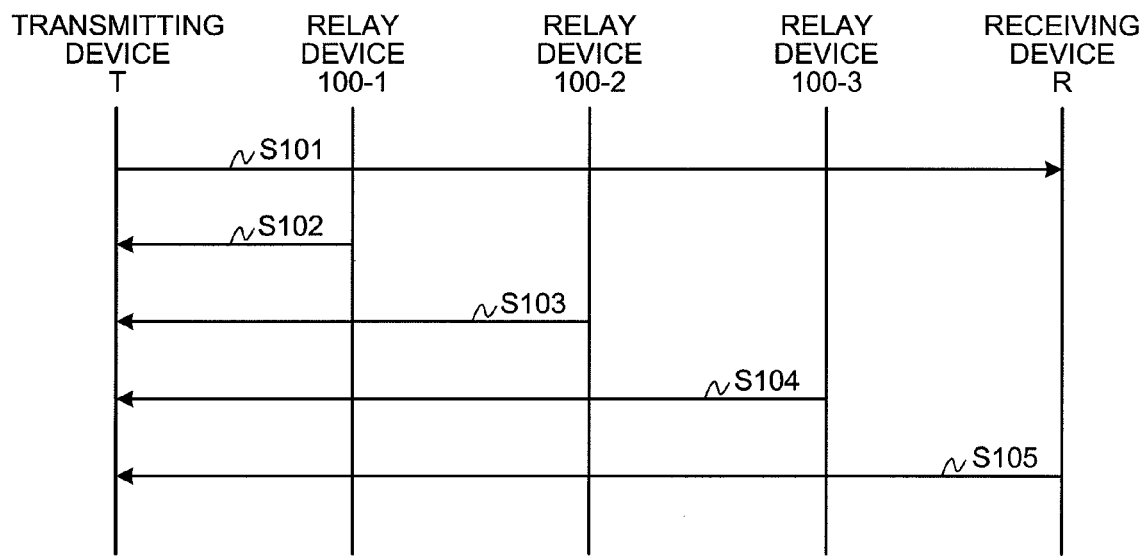
FIG. 2 is a sequence diagram for explaining a basic operation performed by the communication system shown in FIG. 1.

FIG. 2 is a sequence diagram for explaining a basic operation performed by the communication system shown in FIG. 1. The transmitting device T transmits to the receiving device R in multicast, a check frame containing bandwidth data indicating a set bandwidth allocated to a communication between the transmitting device T and the receiving device R (step S101). During a multicast transmission of the check frame, each of the relay devices 100-1 to 100-3 receives the check frame and returns the response frame in response to the check frame to the transmitting device T.

In other words, the relay device 100-1 compares the set bandwidth received with the check frame (hereinafter, "received bandwidth"), with a bandwidth previously set in the relay device 100-1 (hereinafter, "preset bandwidth"), and returns the response frame containing a comparison result to the transmitting device T (step S102). Similarly, each of the relay devices 100-2 and 100-3 returns the response frame containing the comparison result between the received bandwidth and each of the preset bandwidths set respectively in the relay devices 100-2 and 100-3 to the transmitting device T (steps S103 and S104).

Upon receiving the check frame, the receiving device R compares the received bandwidth with the preset bandwidth set in the receiving device R, and returns the response frame containing the comparison result to the transmitting device T (step S105).

Figure 3:
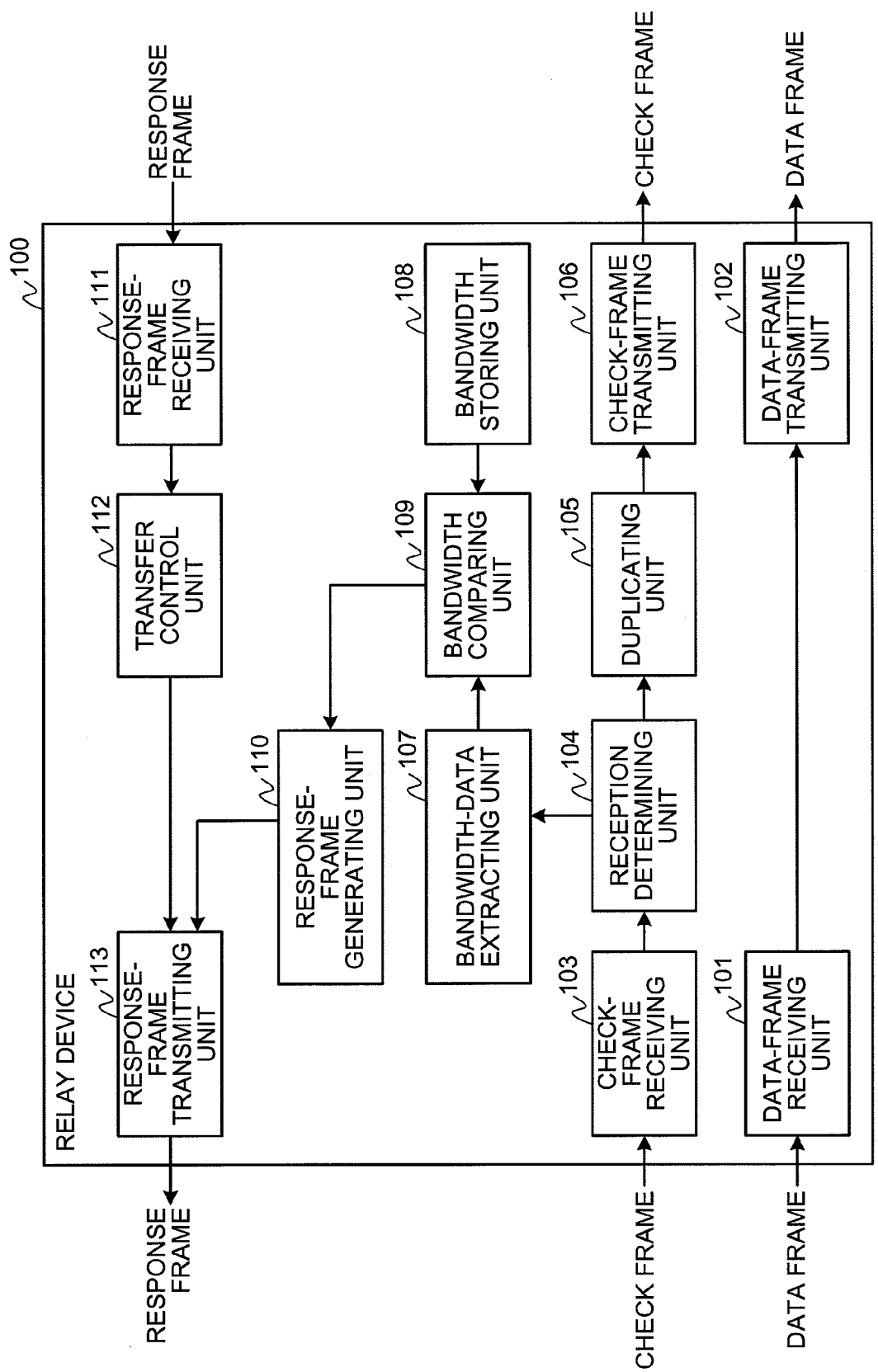
FIG. 3 is a block diagram of a structure of a relevant part of a relay device shown in FIG. 1.

FIG. 3 is a block diagram of a relay device 100 according to the first embodiment. The relay device 100 has a same configuration as those of the relay devices 100-1 to 100-3. The relay device 100 includes a data-frame receiving unit 101, a data-frame transmitting unit 102, a check-frame receiving unit 103, a reception determining unit 104, a duplicating unit 105, a check-frame transmitting unit 106, a bandwidth-data extracting unit 107, a bandwidth storing unit 108, a bandwidth comparing unit 109, a response-frame generating unit 110, a response-frame receiving unit 111, a transfer control unit 112, and a response-frame transmitting unit 113.

The data-frame receiving unit 101 receives a data frame containing normal data from a transmitting device or a relay device located between the relay device 100 and the transmitting device, and outputs the data frame to the data-frame transmitting unit 102.

The data-frame transmitting unit 102 stores therein a source address of the data frame that is output from the data-frame receiving unit 101, in association with a port through that the data frame is received. Subsequently, the data-frame transmitting unit 102 checks a destination address of the data frame and transmits the data frame through a port stored therein in association with the destination address. In this manner, the relay device 100 acquires a port in association with an address and relays the data frame.

The check-frame receiving unit 103 receives the check frame containing bandwidth data of a set bandwidth allocated to a communication between the transmitting device and the receiving device, from the transmitting device or a relay device located between the relay device 100 and the transmitting device, and outputs the check frame to the reception determining unit 104.

The reception determining unit 104 checks the destination address of the check frame output from the check-frame receiving unit 103, and determines whether the receiving device under a control of the relay device 100 belongs to a multicast group specified by the destination address. The reception determining unit 104 determines to receive the check frame exclusively when a target receiving device is under a control of the relay device 100, and outputs the check frame to the duplicating unit 105 and the bandwidth-data extracting unit 107.

The duplicating unit 105 duplicates, for the multicast, the check frame output from the reception determining unit 104, and outputs duplicated check frames to the check-frame transmitting unit 106. Specifically, the duplicating unit 105 duplicates the check frame as many number of the relay devices connected to the relay device 100, and outputs the duplicated check frames to the check-frame transmitting unit 106.

The check-frame transmitting unit 106 transmits the check frames output from the duplicating unit 105, in multicast. Specifically, the check-frame transmitting unit 106 transmits the check frames to all the relay devices connected to the relay device 100.

An example of the contents of the check frame according to the first embodiment is described with reference to FIG. 4. The check frame contains fields of destination address, source address, VWAN data, time to live (TTL), medium access control (MAC) address, bandwidth data, and frame check sequence (FCS), in that order.

The destination address of the check frame contains a multicast address, according to the first embodiment. The reception determining unit 104 receives the check frame exclusively when the relay device 100 controls the receiving device belonging to the multicast group specified by the multicast address. Therefore, the relay device 100 needs not to relay an unnecessary check frame, resulting in preventing a waste of the bandwidth.

The source address of the check frame contains an address of the transmission device. The VWAN data contains identification data of the VWAN to which the transmission device belongs. The TTL is the number of connection stages that contains a predetermined number set by the transmission device, and the number is reduced one by one by each of the relay devices including the relay device 100, every time the check frame is relayed. The MAC address contains a source MAC address of the transmitting device as a transmission source that indicates an absolute location of the transmitting device in a network, and a destination MAC address of the receiving device as a transmission destination that indicates an absolute location of the receiving device in the network.

The bandwidth data contains information on the set bandwidth allocated for the communication between the transmitting device and the receiving device. The set bandwidth is set, for example, depending on a charge for the receiving device, and corresponds to a minimum communication bandwidth assured for the receiving device. Accordingly, it is necessary for the relay device 100 to allocate a bandwidth wider than or equal to the set bandwidth contained in the bandwidth data. If the bandwidth narrower than the set bandwidth is allocated, a throughput is degraded. The FCS is a bit sequence for checking an error of the check frame.

Referring back to FIG. 3, when the check frame is output from the reception determining unit 104, the bandwidth-data extracting unit 107 extracts the bandwidth data of the check frame, and outputs to the bandwidth comparing unit 109, the set bandwidth (the received bandwidth) received with the check frame, and the destination MAC address of the check frame.

The bandwidth storing unit 108 stores therein the bandwidth previously set in the relay device 100 (the preset bandwidth). Specifically, the bandwidth storing unit 108 stores therein the preset bandwidth for each receiving device as the destination, in association with the destination MAC address.

When the received bandwidth and the destination MAC address are output from the bandwidth-data extracting unit 107, the bandwidth comparing unit 109 reads out the preset bandwidth stored in association with the destination MAC address from the bandwidth storing unit 108, and compares the preset bandwidth with the received bandwidth. Subsequently, the bandwidth comparing unit 109 notifies the comparison result, whether the received bandwidth and the preset bandwidth are consistent, to the response-frame generating unit 110.

Upon receiving a notice of the comparison result from the bandwidth comparing unit 109, the response-frame generating unit 110 generates a response frame containing the comparison result whether the received bandwidth and the preset bandwidth are consistent, and bandwidth comparison data containing the received bandwidth and the preset bandwidth. Subsequently, the response-frame generating unit 110 sets the address of the transmitting device as the destination address of the response frame, sets the address of the relay device 100 as the source address of the response frame, and outputs the response frame to the response-frame transmitting unit 113.

An example of the contents of the response frame according to the first embodiment is described with reference to FIG. 5. The response frame contains fields of destination address, source address, VWAN information, TTL, bandwidth comparison data, and FCS.

The destination address of the response frame contains an address of the transmitting device that is the transmission source of the check frame, while the source address of the response frame contains an address of the relay device 100. The VWAN data contains identification of the VWAN to which the relay device 100 belongs. The TTL is data on the number of connection stages and contains a predetermined number set by the transmission device. The number is reduced one by one by each of the relay devices including the relay device 100, every time the check frame is relayed.

The bandwidth comparison data contains a result of a bandwidth comparison obtained by the bandwidth comparing unit 109, the received bandwidth, and the preset bandwidth. As for the result of the bandwidth comparison, the bandwidth comparing unit 109 contains a bit indicating "consistent" when the received bandwidth and the preset bandwidth are consistent, and a bit indicating "inconsistent" when the received bandwidth and the preset bandwidth are inconsistent. Accordingly, when the bit indicating "consistent" is stored as the result field, a same bandwidth is to be stored as each of the received bandwidth and the preset bandwidth.

Referring back to FIG. 3, the response-frame receiving unit 111 receives the response frame from the receiving device or a relay device located between the relay device 100 and the receiving device, and outputs the response frame to the transfer control unit 112.

The transfer control unit 112 checks the destination address of the response frame output from the response-frame receiving unit 111, and performs a control, so that the response frame is transferred to the destination address.

The response-frame transmitting unit 113 transmits the response frame generated by the response-frame generating unit 110 and under a control of the transfer control unit 112, from a port corresponding to the destination address.

Figure 6:
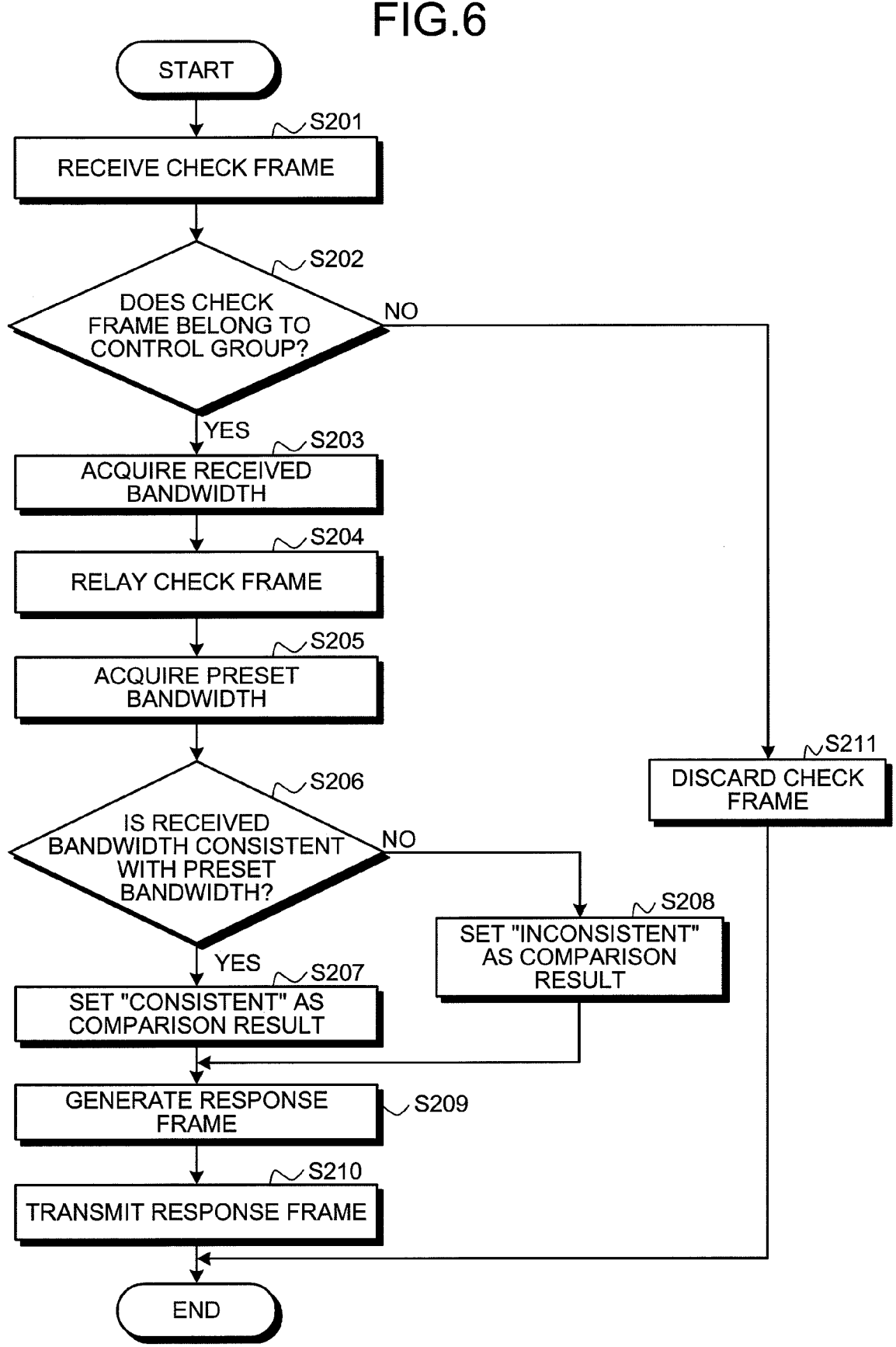
FIG. 6 is a flowchart of an operation performed by the relay device shown in FIG. 1.

An operation of a reception of the check frame performed by the relay device 100 with the above configuration is described with reference to a flowchart shown in FIG. 6.

According to the first embodiment, the transmitting device stores the set bandwidth allocated to a communication between the transmitting device and the receiving device in the bandwidth data field, and transmits the check frame in which the address of the transmitting device is set as the source MAC address, while the address of the receiving device is set as the destination MAC address, in multicast, at a predetermined timing.

The check-frame receiving unit 103 of the relay device 100 connected to the transmitting device receives the transmitted check frame (step S201). The reception determining unit 104 determines whether the receiving device belonging to the multicast group corresponding to the destination address of the check frame is under control of the relay device 100 (step S202). If a target receiving device is not under a control of the relay device 100 (No at step S202), the received check frame is discarded (step S211). Therefore, unnecessary check frame is not relayed, resulting in preventing a waste of the bandwidth.

If there is the receiving device belonging to the multicast group under a control of the relay device 100 (Yes at step S202), the check frame is output to the duplicating unit 105 and the bandwidth-data extracting unit 107. The bandwidth-data extracting unit 107 extracts the bandwidth data of the check frame, and acquires the received bandwidth that is stored by the transmitting device and received as the check frame (step S203). The received bandwidth acquired is output with the destination MAC address of the check frame to the bandwidth comparing unit 109.

On the other hand, when the check frame is output to the duplicating unit 105, the duplicating unit 105 duplicates the check frames as many number of the devices connected to the relay device 100. The check-frame transmitting unit 106 transmits the duplicated check frames to each of the nodes (step S204). The receiving device belonging to the multicast group corresponding to the destination address or the relay device that controls the receiving device receives the check frames transmitted in the above manner.

When the received bandwidth and the destination MAC address are output to the bandwidth comparing unit 109 at the same time of the relay of the check frame, the bandwidth comparing unit 109 reads out the preset bandwidth previously stored in the bandwidth storing unit 108, in association with the destination MAC address (step S205). The bandwidth comparing unit 109 compares the received bandwidth with the preset bandwidth (step S206), and notifies a comparison result, whether the received bandwidth and the preset bandwidth are consistent, to the response-frame generating unit 110.

Figures 4, 5:
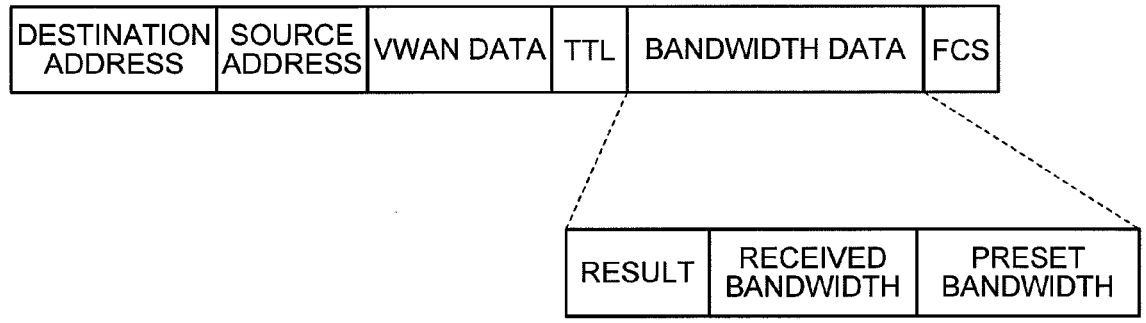
FIG. 4 is a diagram of an example of contents of a check frame according to the first embodiment.
FIG. 5 is a diagram of an example of contents of a response frame according to the first embodiment.

When the comparison result obtained by the bandwidth comparing unit 109 indicates that the received bandwidth and the preset bandwidth are consistent (Yes at step S206), the response-frame generating unit 110 sets the comparison result stored as the field of the bandwidth comparison data of the response frame shown in FIG. 5 to be "consistent" (step S207). When the comparison result obtained by the bandwidth comparing unit 109 indicates that the received bandwidth and the preset bandwidth are inconsistent (No at step S206), the response-frame generating unit 110 sets the comparison result to be "inconsistent" (step S208).

According to the first embodiment, the result is set to be "consistent" exclusively when the received bandwidth and the preset bandwidth are consistent after comparing the received bandwidth that is stored by the transmitting device as the bandwidth data field of the check frame, with the preset bandwidth previously set in each of the relay devices. Therefore, if the bandwidths are inconsistent in the relay devices due to a wrong setting or the like, the bit indicating "inconsistent" is stored as the bandwidth-comparison data field in the response frame to be returned from the relay device to the transmitting device.

Upon setting the bandwidth comparison result to be "consistent" or "inconsistent", the response-frame generating unit 110 continues to generate the response frame (step S209). In other words, in the response frame shown in FIG. 5, the address of the transmitting device is set as the destination address while the address of the relay device 100 is set as the source address. The previously set result of the bandwidth comparison is stored as the bandwidth comparison data. Specifically, if the result is "consistent", "1" is set at the head of the bandwidth-comparison data field, and if the result is "inconsistent", "0" is set at the head of the bandwidth-comparison data field. The received bandwidth and the preset bandwidth are set in subsequent positions of the bit indicating the result, as the bandwidth-comparison data field.

The response frame generated in the above manner is output to the response-frame transmitting unit 113, and is transmitted from the response-frame transmitting unit 113 to the transmitting device specified by the destination address or a relay device located between the relay device 100 and the transmitting device (step S210).

The above response operation of the response frame is performed by all the relay devices that receive the check frame, and the transmitting device receives the response frames from all the relay devices provided between the transmitting device and the receiving device. Because the response frame contains the result of the bandwidth comparison performed by each of the relay devices, that is, the data indicating whether the bandwidths are inconsistent, it is possible for the transmitting device to easily identify a relay device causing the degradation of the throughput due to the bandwidth inconsistency.

As described above, according to the first embodiment, the response frame containing the bandwidth comparison result, whether the received bandwidth and the preset bandwidth are consistent, is returned from all the relay devices provided between the transmitting device and the receiving device, in response to the check frame transmitted from the transmitting device in multicast. Therefore, the transmitting device can determine whether there is the bandwidth inconsistency set in each of the relay devices located between the transmitting device and the receiving device. As a result, it is possible to easily identify the cause of the degradation of the throughput due to the bandwidth consistency.

A second embodiment of the present invention is different from the first embodiment in that each of the relay devices compares a bandwidth set in a previous node with a bandwidth set in a target device, and transmits a comparison result to a subsequent node.

A general configuration of a communication system according to the second embodiment is the same as that of the first embodiment shown in FIG. 1, and therefore, the explanation thereof is omitted. A basic operation of the communication system according to the second embodiment is different from that of the first embodiment. In the second embodiment, a communication from the transmitting device T to the receiving device R is called an upstream communication, while a communication from the receiving device R to the transmitting device T is called a downstream communication.

Figure 7:
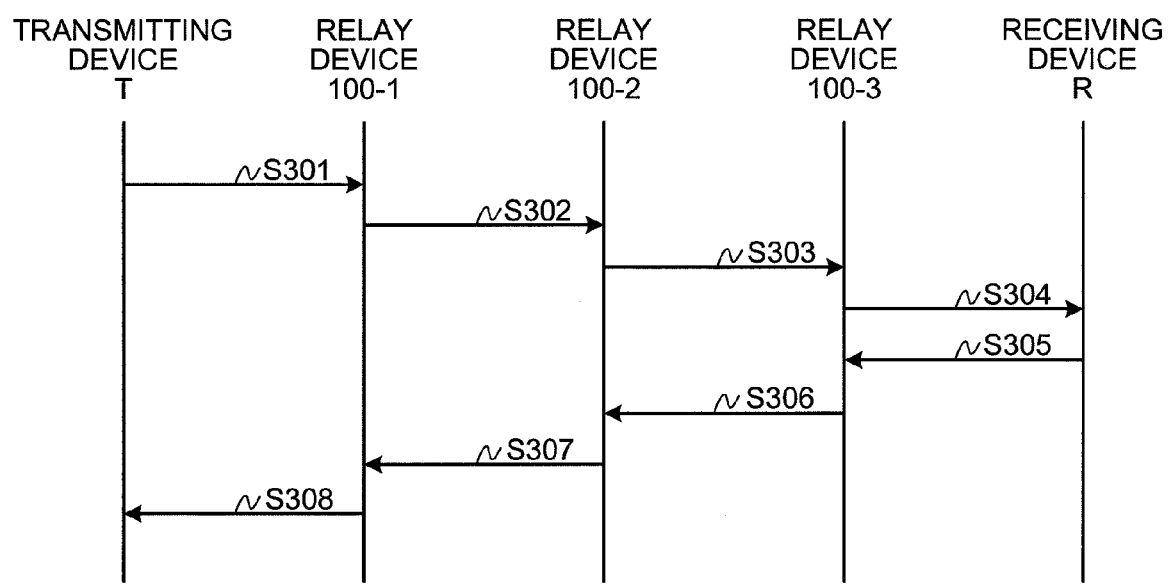
FIG. 7 is a sequence diagram of a basic operation performed by a communication system according to a second embodiment of the present invention.

FIG. 7 is a sequence diagram of the basic operation performed by the communication system according to the second embodiment. The transmitting device T transmits the check frame containing bandwidth data indicating an upstream bandwidth allocated to an upstream communication from the transmitting device T to the receiving device R, to the relay device 100-1 (step S301). Upon receiving the check frame, the relay device 100-1 compares a received bandwidth (i.e., the upstream bandwidth of the transmitting device T), with the preset upstream bandwidth of the relay device 100-1, and transmits the check frame with the comparison result and the preset upstream bandwidth stored as the bandwidth data field, to the relay device 100-2 (step S302). Upon receiving the check frame, the relay device 100-2 compares the preset upstream bandwidth of the relay device 100-1 (i.e., the received bandwidth of the relay device 100-2), with the preset upstream bandwidth of the relay device 100-2, and transmits the check frame containing the comparison result, the comparison result obtained by the relay device 100-1, and the preset upstream bandwidth of the relay device 100-2, in the bandwidth data field, to the relay device 100-3 (step S303).

Similarly to the above, upon receiving the check frame, the relay device 100-3 transmits the check frame containing the comparison result obtained by the relay devices 100-1 and 100-2, and the preset upstream bandwidth (the upstream bandwidth of the relay device 100-3), to the receiving device R (step S304). The receiving device R generates the response frame that contains the bandwidth comparison result for the upstream communication path between each of the relay devices provided between the transmitting device T and the receiving device R, and a downstream bandwidth allocated to for a downstream communication from the receiving device R to the transmitting device T, in the bandwidth data field, and transmits the response frame to the relay device 100-3 (step S305).

Upon receiving the response frame, the relay device 100-3 compares the downstream bandwidth of the receiving device R that is stored as the bandwidth data field, with a preset downstream bandwidth of the relay device 100-3, and transmits the response frame containing the comparison result, the comparison result for the upstream communication path, and the preset downstream bandwidth of the relay device 100-3, in the bandwidth data field, to the relay device 100-2 (step S306). Similarly to the above, the relay device 100-2 transmits the response frame containing the comparison result for each of the upstream communication paths, the comparison result for each of the downstream communication paths to the relay device 100-2, and the preset downstream bandwidth of the relay device 100-2, in the bandwidth data field, to the relay device 100-1 (step S307). The relay device 100-1 transmits the response frame containing the comparison result for all the communication paths from the transmitting device T to the relay device 100-1 via the receiving device R, and the preset downstream bandwidth of the relay device 100-1, to the transmitting device T (step S308).

Figure 8:
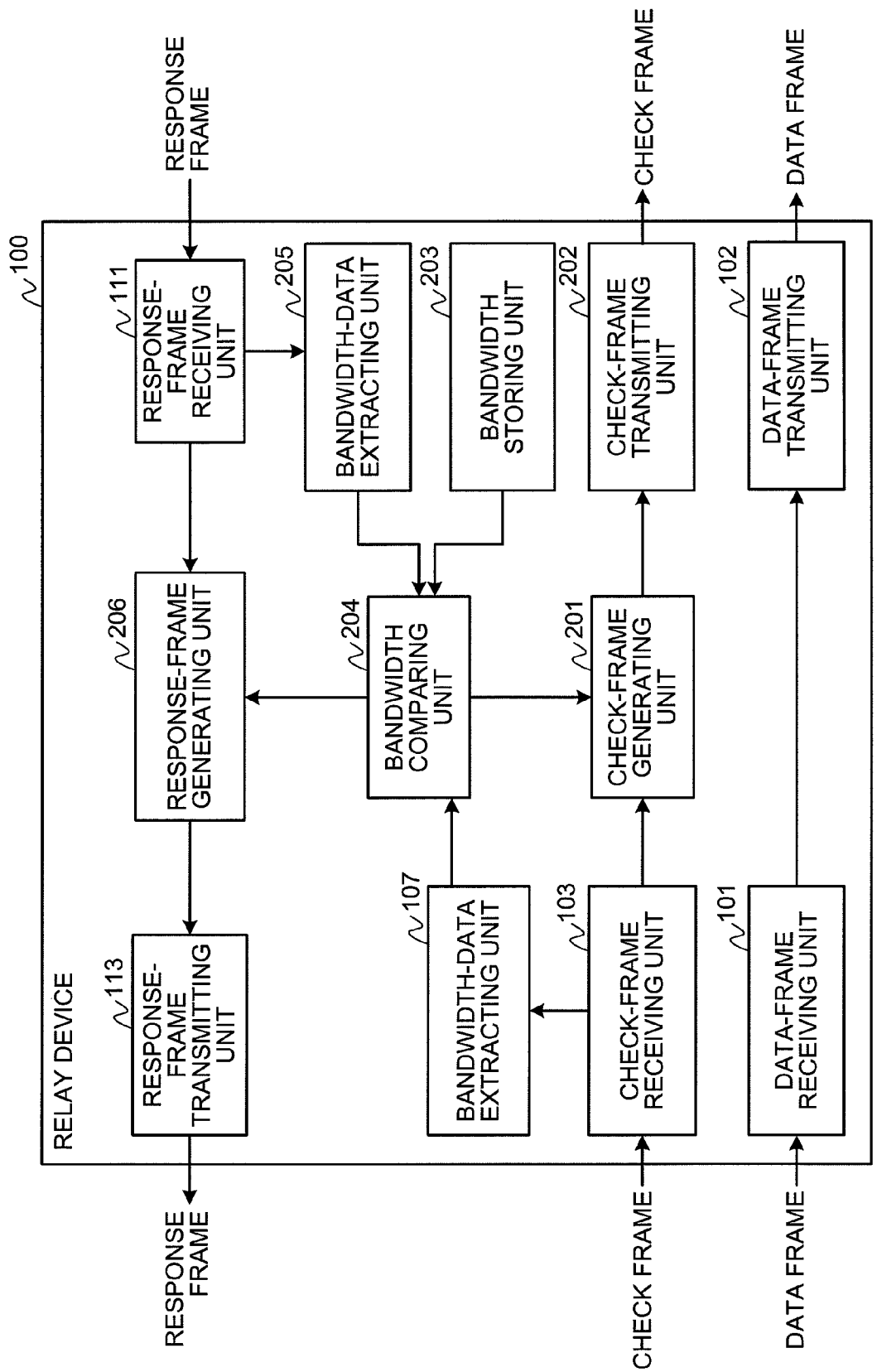
FIG. 8 is a block diagram of a structure of a relevant part of a relay device shown in FIG. 7.

FIG. 8 is a block diagram of the relay device 100. Each of the units assigned with the same reference numeral shown in FIG. 3 functions similarly to those shown in FIG. 3, and therefore, explanations thereof are omitted. The relay device 100 shown in FIG. 8 has the same configuration as those of the relay devices 100-1 to 100-3. The relay device 100 shown in FIG. 8 includes the data-frame receiving unit 101, the data-frame transmitting unit 102, the check-frame receiving unit 103, the bandwidth-data extracting unit 107, a check-frame generating unit 201, a check-frame transmitting unit 202, a bandwidth storing unit 203, a bandwidth comparing unit 204, the response-frame receiving unit 111, a bandwidth-data extracting unit 205, a response-frame generating unit 206, and the response-frame transmitting unit 113.

The check-frame generating unit 201 generates a check frame by adding the bandwidth comparison result obtained by the bandwidth comparing unit 204 and the preset upstream bandwidth of the relay device 100 to the check frame received by the check-frame receiving unit 103. In other words, the check-frame generating unit 201 generates the check frame by additionally storing the bandwidth comparison result in the relay device 100, and the preset upstream bandwidth previously set for the upstream communication of the relay device 100, in the bandwidth data field.

The check-frame transmitting unit 202 transmits the check frame generated by the check-frame generating unit 201 to the receiving device or a relay device located between the relay device 100 and the receiving device.

The bandwidth storing unit 203 stores therein the preset upstream bandwidth and the preset downstream bandwidth, previously set for the upstream communication and the downstream communication of the relay device 100, respectively. Specifically, the bandwidth storing unit 203 stores therein the preset upstream bandwidth and the preset downstream bandwidth for each of the receiving device and the transmitting device, in association with the destination MAC address.

The bandwidth comparing unit 204 reads out the preset upstream bandwidth stored in association with the destination MAC address from the bandwidth storing unit 203 and compares the preset upstream bandwidth with the received bandwidth when the bandwidth-data extracting unit 107 outputs the received bandwidth and the destination MAC address.

The bandwidth comparing unit 204 notifies the comparison result whether the received bandwidth and the preset upstream bandwidth are consistent, to the check-frame generating unit 201.

The bandwidth comparing unit 204 reads out the preset downstream bandwidth stored in association with the destination MAC address from the bandwidth storing unit 203 and compares the preset downstream bandwidth with the received bandwidth when the bandwidth-data extracting unit 205 outputs the received bandwidth and the destination MAC address. The bandwidth comparing unit 204 notifies the comparison result whether the received bandwidth and the preset downstream bandwidth are consistent, to the response-frame generating unit 206. The destination MAC address output from the bandwidth-data extracting unit 205 is the MAC address of the transmitting device that is included in the response frame.

The bandwidth-data extracting unit 205 extracts the bandwidth data of the response frame when the response-frame receiving unit 111 receives the response frame, and outputs the set bandwidth (received bandwidth) received with the response frame, in addition to the destination MAC address of the response frame to the bandwidth comparing unit 204.

The response-frame generating unit 206 generates the response frame by adding the bandwidth comparison result obtained by the bandwidth comparing unit 204 and the preset downstream bandwidth of the relay device 100 to the response frame received by the response-frame receiving unit 111. In other words, the response-frame generating unit 206 generates the response frame by additionally storing the bandwidth comparison result of the relay device 100 and the preset downstream bandwidth previously set for the downstream communication of the relay device 100, in the bandwidth data field of the received response frame.

According to the second embodiment, the general configurations of the check frame and the response frame are substantially the same. In other words, like the check frame shown in FIG. 4, the check frame and the response frame according to the second embodiment contain fields of destination address, sources address, VWAN data, TTL, MAC address, bandwidth data, and FCS. According to the second embodiment, the bandwidth data contains the bandwidth comparison result of all the communication paths between the devices provided between the relay device 100 and the previous device, and the preset bandwidth previously set in the relay device 100. In this case, if the frame is the check frame transmitted from the transmitting device to the receiving device, the preset upstream bandwidth is stored therein, and if the frame is the response frame transmitted from the receiving device to the transmitting device, the preset downstream bandwidth is stored therein.

According to the second embodiment, each of the check frame and the response frame has a different MAC address. In other words, for the check frame, the destination MAC address is the address of the receiving device, and the source MAC address is the address of the transmitting device. On the other hand, for the response frame, the destination MAC address is the address of the transmitting device, and the source MAC address is the address of the receiving device. For the destination MAC address at the top of each of the frames, the address of the receiving device or a relay device located between the relay device 100 and the receiving device is set in the check frame. On the other hand, the address of the transmitting device or a relay device located between the relay device 100 and the transmitting device is set in the response frame. The source address corresponds to the address of the relay device 100 for the check frame and the response frame.

Figure 9:
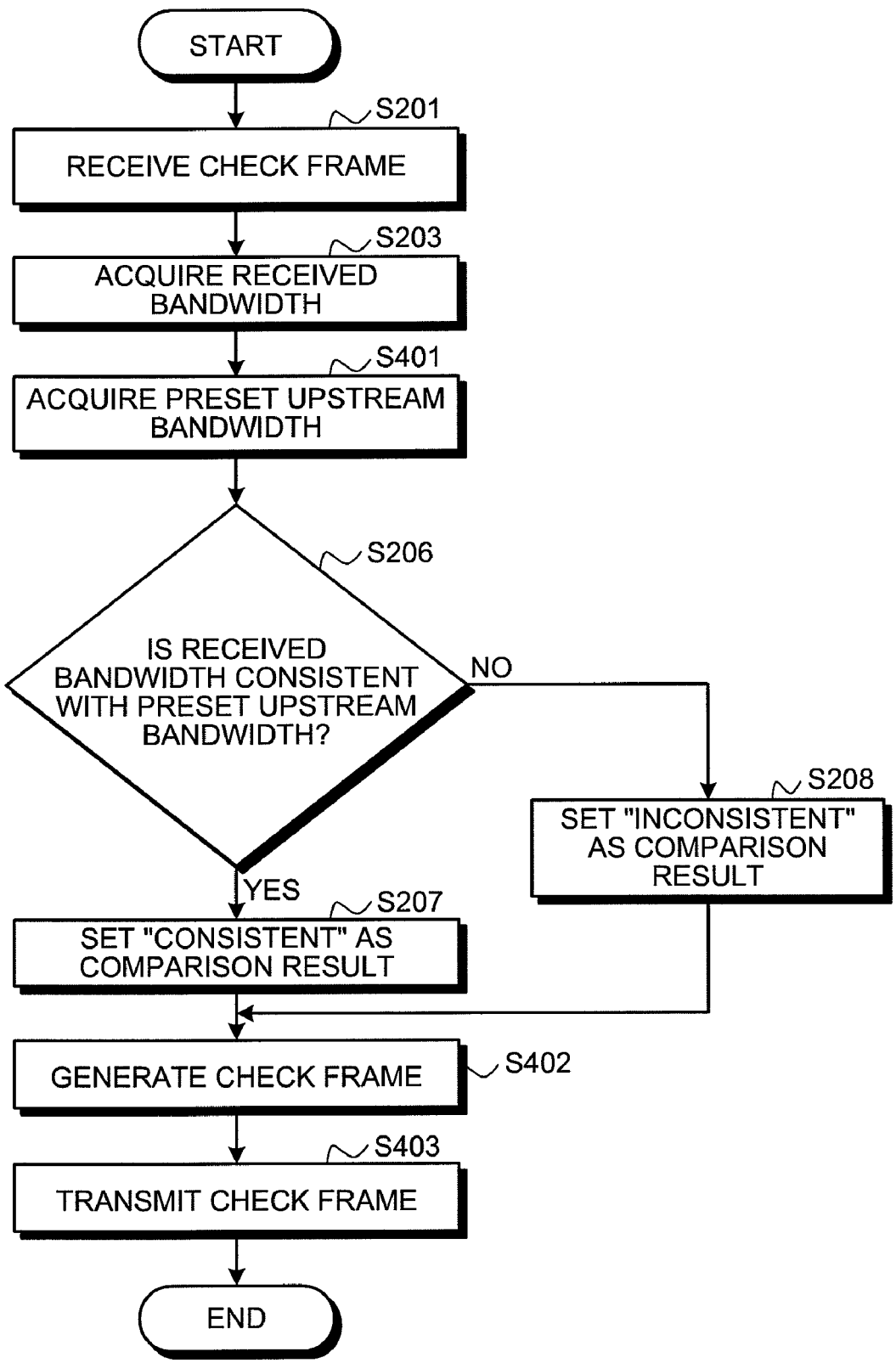
FIG. 9 is a flowchart of an operation of receiving a check frame performed by the relay device shown in FIG. 7.

An operation of a reception of the check frame performed by the relay device 100 with the above configuration is described with reference to a flowchart shown in FIG. 9. The same procedures as those shown in FIG. 6 are described with the same reference steps shown in FIG. 6.

According to the second embodiment, the transmitting device stores the set bandwidth allocated for the communication between the transmitting device and the receiving device, in the bandwidth data field, sets the address of the transmitting device as the source MAC address, sets the address of the receiving device as the destination MAC address, and transmits the check frame to the relay device located at the closest to the transmitting device, at a predetermined timing. In this case, it is assumed that the relay device 100 is located at the closest to the transmitting device.

The transmitted check frame is received by the check-frame receiving unit 103 of the relay device 100 connected to the transmitting device (step S201). The bandwidth-data extracting unit 107 extracts the bandwidth data of the check frame, and acquires the received bandwidth that is stored by the transmitting device and received as the check frame (step S203). The received bandwidth is output with the destination MAC address of the check frame to the bandwidth comparing unit 204. In this case, the destination MAC address to be output is the address of the receiving device.

The bandwidth comparing unit 204 reads out the preset upstream bandwidth previously stored in association with the MAC address in the bandwidth storing unit 203 (step S401). Subsequently, the bandwidth comparing unit 204 compares the received bandwidth with the preset upstream bandwidth (step S206), and notifies the comparison result whether the received bandwidth and the preset upstream bandwidth are consistent, to the check-frame generating unit 201.

When the comparison result obtained by the bandwidth comparing unit 204 indicates that the received bandwidth and the preset upstream bandwidth are consistent (Yes at step S206), a response-frame generating unit 201 sets the comparison result stored as the field of the bandwidth comparison data in the response frame to be "consistent" (step S207). When the comparison result obtained by the bandwidth comparing unit 204 indicates that the received bandwidth and the preset upstream bandwidth are inconsistent (No at step S206), the response-frame generating unit 210 sets the comparison result to be "inconsistent" (step S208).

According to the second embodiment, the result is to be "consistent" exclusively when the received bandwidth and the preset upstream bandwidth previously set in each of the relay devices are consistent, after the received bandwidth stored by the transmitting device as the bandwidth data field of the check frame is compared with the preset upstream bandwidth previously set in each of the relay devices. Therefore, if the bandwidths are not inconsistent between the subsequent relay devices, the check frame that is transmitted from the relay device to the subsequent relay device, contains the bit indicating "inconsistent" in the bandwidth-comparison data field.

Upon setting the bandwidth comparison result to be "consistent" or "inconsistent", the check-frame generating unit 201 continues to generate the check frame (step S402). In other words, the destination address corresponds to the address of the receiving device or the upstream relay device located on the upstream side of the relay device 100, while the source address corresponds to the address of the relay device 100. The previously set result of the bandwidth comparison and the preset upstream bandwidth is additionally stored in the bandwidth comparison data. Specifically, the result indicating "consistent" or "inconsistent" and the preset upstream bandwidth stored in the bandwidth storing unit 203 are added to the bandwidth data field of the check frame received by the check-frame receiving unit 103. Therefore, the bandwidth comparison results for each communication path to the relay device 100 are accumulated in the check frame generated by the check-frame generating unit 201.

The check frame generated in the above manner is output to the check-frame transmitting unit 202, and is transmitted from the check-frame transmitting unit 202 to the receiving device specified by the destination address or to a relay device located between the relay device 100 and the receiving device (step S403).

Figure 10:
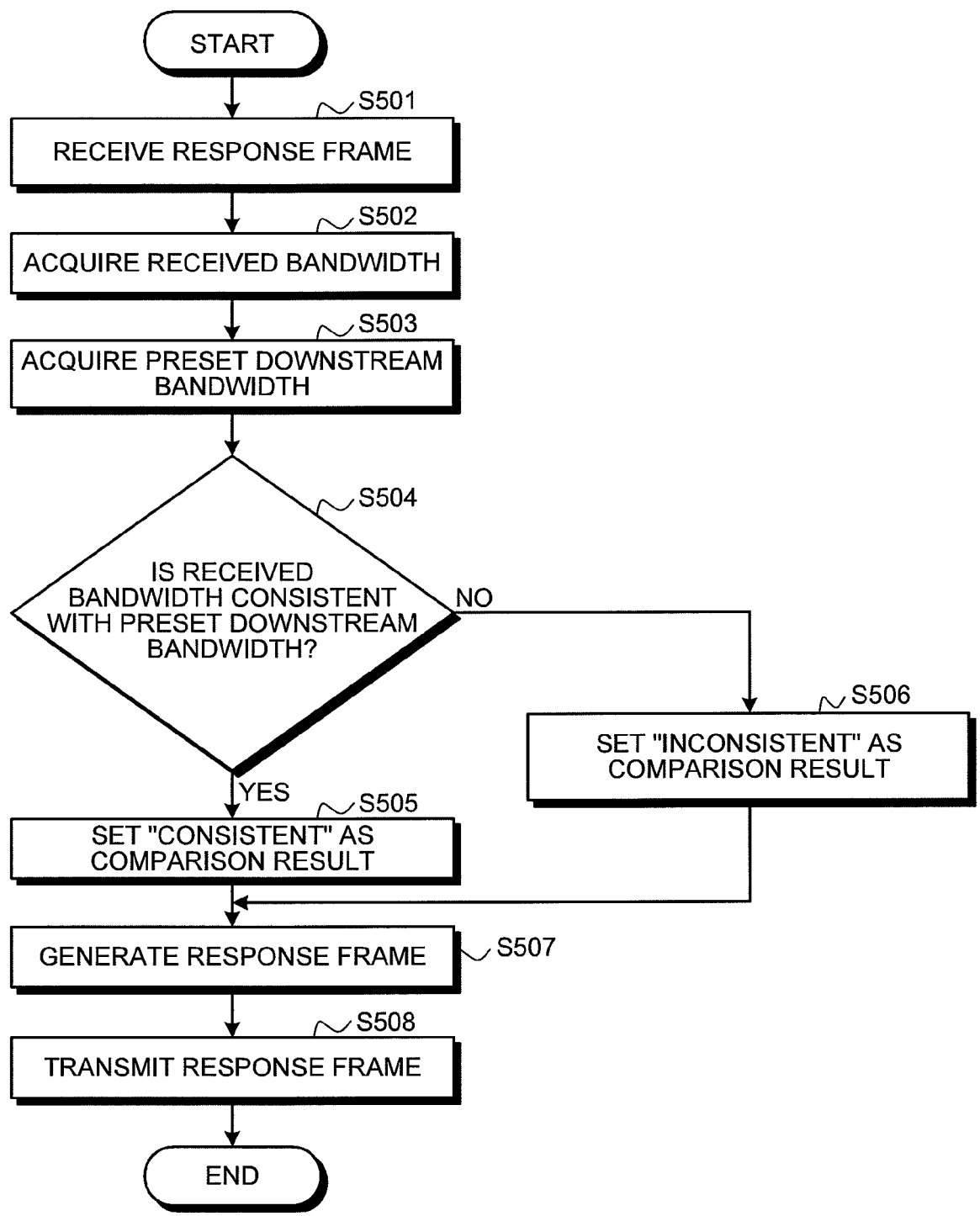
FIG. 10 is a flowchart of an operation of receiving a response frame performed by the relay device shown in FIG. 7.

The above operation of a transmission of the check-frame is performed by all the relay devices provided between the transmitting device and the receiving device, and the receiving device receives the check frame containing the bandwidth comparison result of all the relay devices provided between the transmitting device and the receiving device. The receiving device generates the response frame by storing, in the bandwidth data field, the bandwidth comparison result included in the check frame and the set bandwidth allocated for the communication between the receiving device and the transmitting device, and transmits the response frame to the relay device located at the closest to the receiving device, at a predetermined timing. In this case, it is assumed that the relay device 100 is located at the closest to the receiving device, and the operation performed by the relay device 100 for receiving the response frame is described with reference to a flowchart shown in FIG. 10.

The response frame transmitted is received by the response-frame receiving unit 111 of the relay device 100 connected to the receiving device (step S501). The bandwidth-data extracting unit 205 extracts the bandwidth data of the response frame, and the receiving device acquires the received bandwidth that is stored and received as the response frame by the receiving device (step S502). The acquired received bandwidth is output with the destination MAC address of the response frame to the bandwidth comparing unit 204. The MAC address to be output is the address of the transmitting device.

The bandwidth comparing unit 204 reads out the preset downstream bandwidth previously stored in association with the destination MAC address in the bandwidth storing unit 203 (step S503). The bandwidth comparing unit 204 compares the received bandwidth with the preset downstream bandwidth (step S504), and notifies the comparison result whether the received bandwidth with the preset downstream bandwidth are consistent, to the response-frame generating unit 206.

When the comparison result obtained by the bandwidth comparing unit indicates that the received bandwidth with the preset downstream bandwidth are consistent (Yes at step S504), the response-frame generating unit 206 sets the bandwidth comparison result to be "consistent" that is stored in the bandwidth data field of the response frame to be generated (step S505). When the comparison result obtained by the bandwidth comparing unit indicates that the received bandwidth and the preset downstream bandwidth are inconsistent (No at step S504), the response-frame generating unit 206 sets the bandwidth comparison result to be "inconsistent" (step S506).

According to the second embodiment, the received bandwidth stored in the bandwidth data field of the response frame by the receiving device or a relay device located between the relay device 100 and the receiving device is compared with the preset downstream bandwidth previously set in each of the relay devices. Exclusively when the received bandwidth and the preset downstream bandwidth are consistent, the result is to be "consistent". Therefore, if the bandwidths of subsequent relay devices are inconsistent, the response frame transmitted from the relay device to the subsequent relay device contains the bit indicating "inconsistent" in the bandwidth data field.

Upon setting the bandwidth comparison result to be "consistent" or "inconsistent", the response-frame generating unit 206 continues to generate the response frame (step S507). In other words, the destination address is the address of the transmitting device or the relay device located between the transmitting device and the relay device 100, while the source address is the address of the relay device 100. The previously set result of the bandwidth comparison and the preset downstream bandwidth is additionally stored in the bandwidth comparison data. Specifically, the result indicating "consistent" or "inconsistent" and the preset downstream bandwidth stored in the bandwidth storing unit 203 are added to the bandwidth data field of the check frame received by the response-frame receiving unit 111. Therefore, the bandwidth comparison results for each communication path to the relay device 100 are accumulated in the response frame generated by the response-frame generating unit 206.

The response frame generated in the above manner is output to the response-frame transmitting unit 113, and is transmitted from the response-frame transmitting unit 113 to the transmitting device specified by the destination address or a relay device located between the relay device 100 and the transmitting device (step S508). If the set bandwidths in the subsequent relay devices are the same with each other, the bandwidths between the above two relay devices are consistent even when the set bandwidths are wrongly set. However, the bandwidths between one of the two relay devices and a relay device subsequent to the above two relay devices are inconsistent because of the wrong bandwidth. As a result, it is possible to obtain data sufficient for identifying the relay devices in which the bandwidths are inconsistent.

The above transmission operation of the response frame is performed by all the relay devices that provided between the transmitting device and the receiving device, and the transmitting device receives the response frames containing the result of the bandwidth comparison of the upstream and the downstream communications in all the relay devices provided between the transmitting device and the receiving device. As a result, it is possible to easily identify that which relay device causes the bandwidth inconsistency, and the degradation of the throughput for each of the upstream and the downstream communications.

As described above, according to the second embodiment, the check frame and the response frame are generated, in which the comparison results obtained by comparing the set bandwidth in the previous relay device and the preset bandwidth set in the target relay device are accumulated. The check frame and the response frame are transmitted to the subsequent relay device, and the transmitting device receives the response frame containing the bandwidth comparison results of all the upstream and the downstream communication paths. Therefore, the transmitting device can determine whether the set bandwidths are inconsistent in the upstream and the downstream communications between the relay devices provided between the transmitting device and the receiving device. As a result, it is possible to easily identify the cause of the degradation of the throughput due to the bandwidth inconsistency, for each of the upstream and the downstream communications.

A third embodiment of the present invention is different from the first and the second embodiments in that the relay device returns the response frame for the check frame transmitted in multicast, exclusively when the bandwidth comparison result is determined to be "inconsistent".

The general configuration of a communication system according to the third embodiment is the same as that of the first embodiment shown in FIG. 1, and therefore, explanation thereof is omitted. A basic operation of the communication system according to the third embodiment is different from that of the first embodiment.

Figure 11:
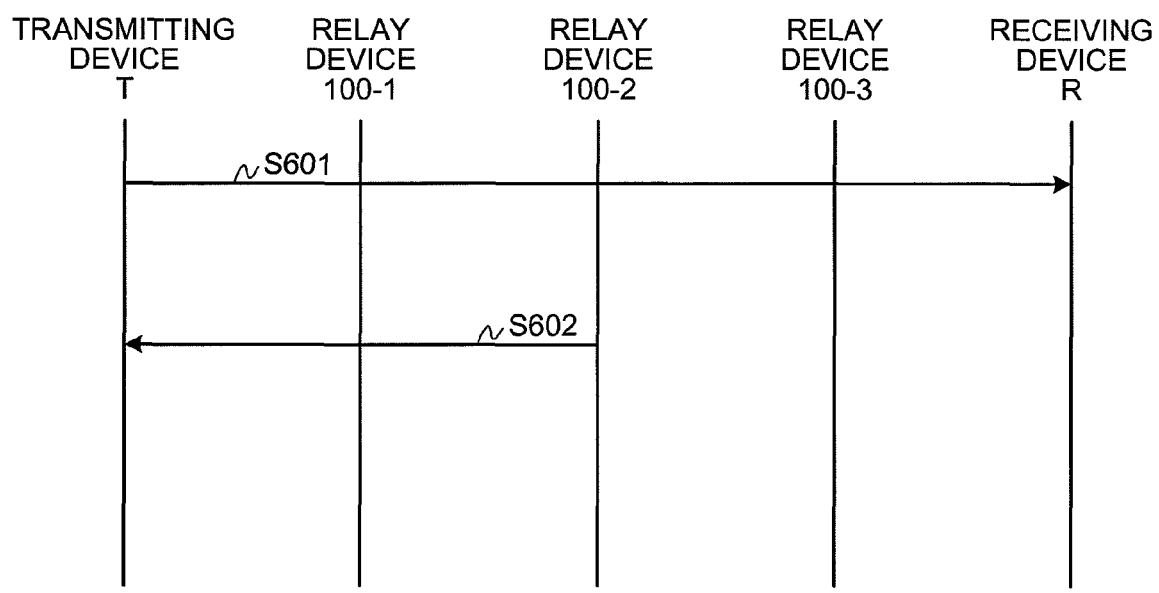
FIG. 11 is a sequence diagram of a basic operation performed by a communication system according to a third embodiment of the present invention.

FIG. 11 is a sequence diagram of the basic operation performed by the communication system according to the third embodiment. The transmitting device T transmits the check frame containing the bandwidth data indicating the set bandwidth allocated for the communication between the transmitting device T and the receiving device R, to the receiving device R, in multicast (step S601). During the multicast transmission of the check frame, each of the relay devices 100-1 to 100-3 receives the check frame and performs a comparison between the received bandwidth and the preset bandwidth. Based on a result obtained by the comparison, if the comparison result is "inconsistent" exclusively in the relay device 100-2, the relay device 100-2 returns the response frame containing the comparison result to the transmitting device T (step S602).

Figure 12:
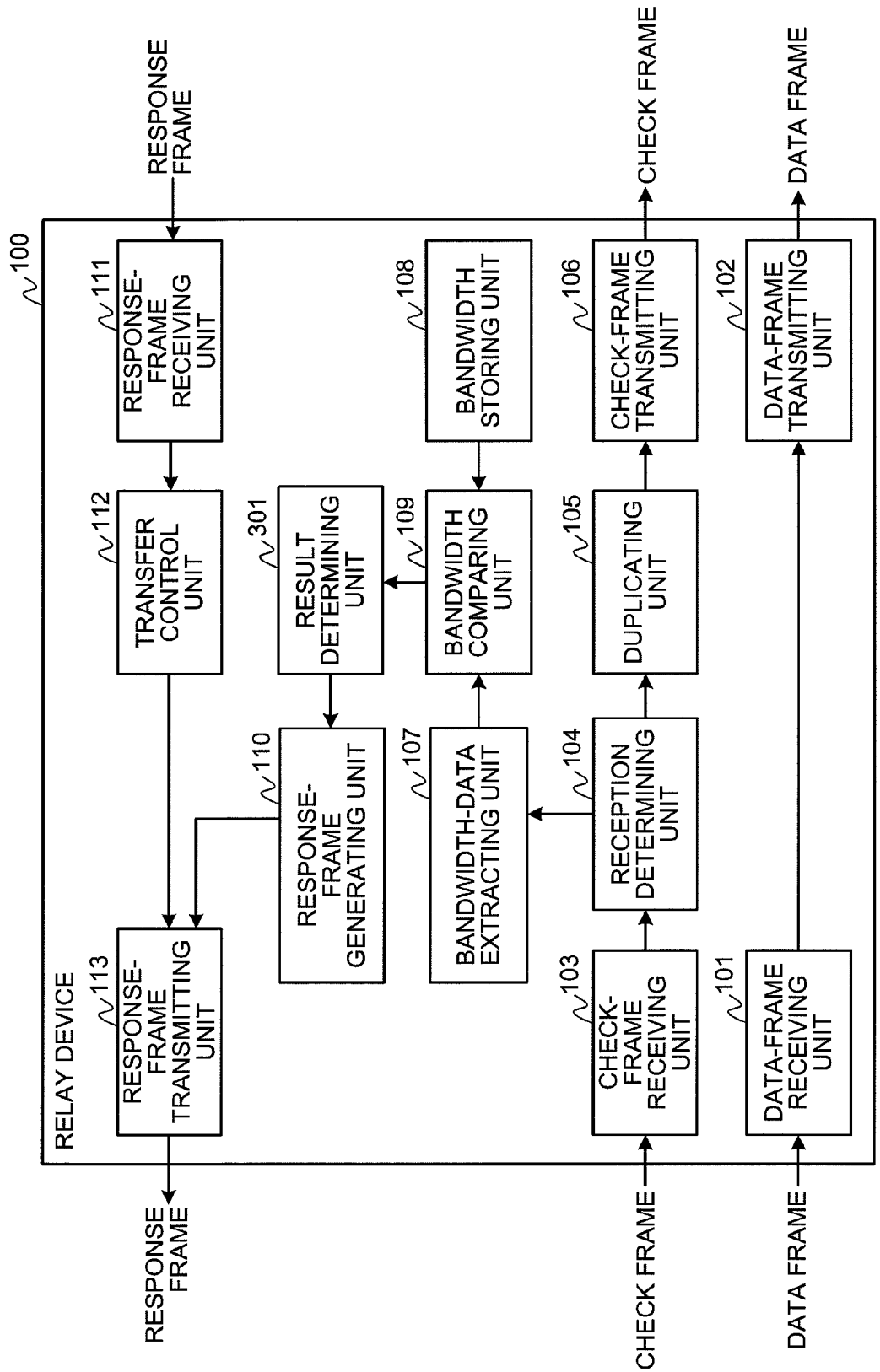
FIG. 12 is a block diagram of a structure of a relevant part of a relay device shown in FIG. 11.

FIG. 12 is a block diagram of the relay device 100 according to the third embodiment. Each of units assigned with the same reference numerals shown in FIG. 3 functions similarly to those shown in FIG. 3, and therefore, explanations thereof are omitted. The relay device 100 shown in FIG. 12 has the same configuration as those of the relay devices 100-1 to 100-3. The relay device 100 shown in FIG. 12 includes the data-frame receiving unit 101, the data-frame transmitting unit 102, the check-frame receiving unit 103, the reception determining unit 104, the duplicating unit 105, the check-frame transmitting unit 106, the bandwidth-data extracting unit 107, the bandwidth storing unit 108, the bandwidth comparing unit 109, a result determining unit 301, the response-frame generating unit 110, the response-frame receiving unit 111, and the response-frame transmitting unit 113.

The result determining unit 301 refers to the result of the bandwidth comparison obtained by the bandwidth comparing unit 109, and instructs the response-frame generating unit 110 to generate the response frame, exclusively when the received bandwidth and the preset bandwidth are inconsistent. In this case, the result determining unit 301 notifies the received bandwidth and the preset bandwidth, in addition to the instruction for generating the response frame, to the response-frame generating unit 110.

Figure 13:
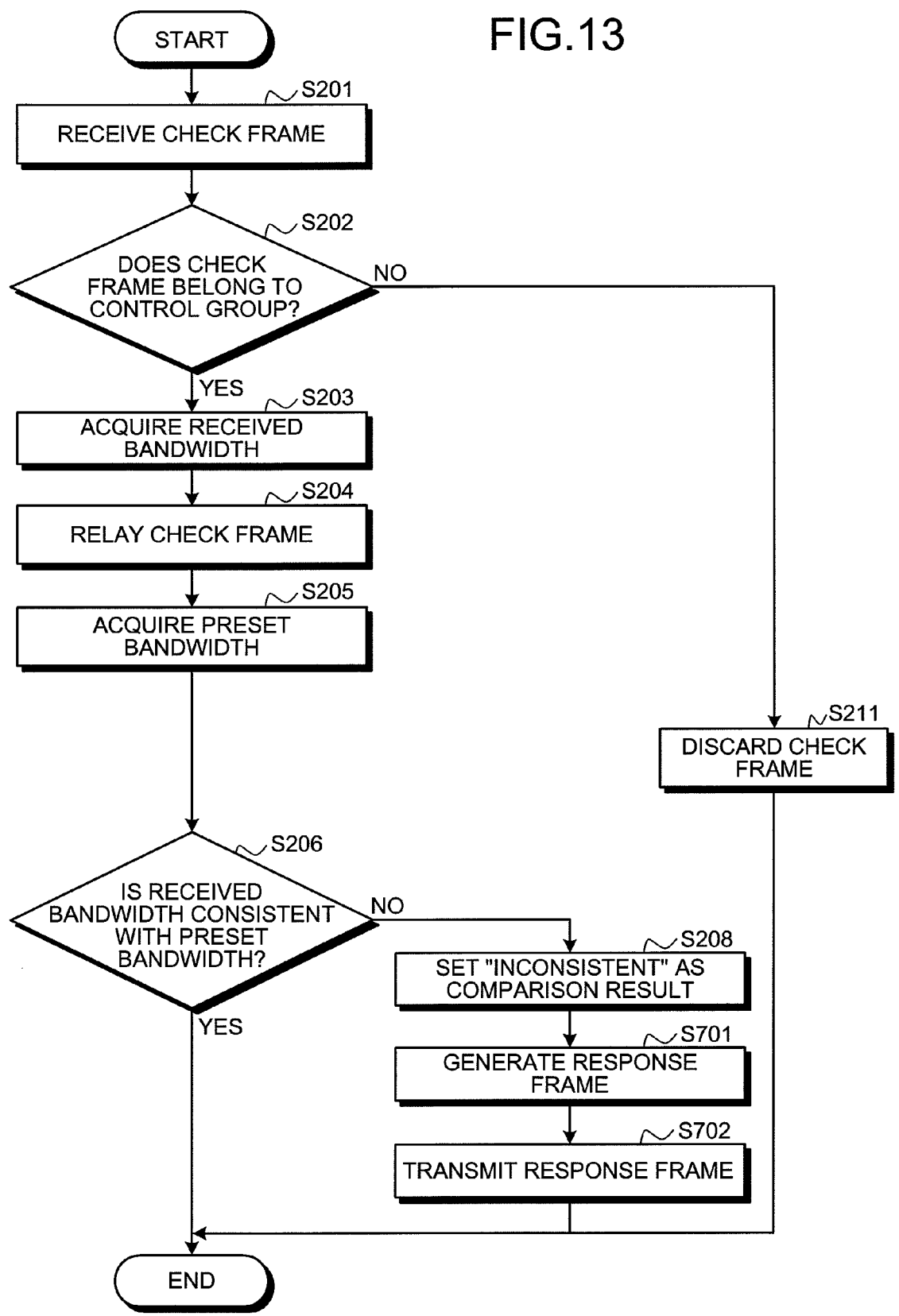
FIG. 13 is flowchart of an operation of the relay device shown in FIG. 11.

An operation of a reception of the check frame performed by the relay device 100 configured in the above manner is described with reference to a flowchart shown in FIG. 13. The same procedures as those shown in FIG. 6 are assigned with the same reference steps.

According to the third embodiment, the transmitting device stores, in the bandwidth data field, the set bandwidth allocated for the communication between the transmitting device and the receiving device, sets the address of the transmitting device as the source MAC address, sets the address of the receiving device as the destination MAC address, and transmits the check frame in multicast, at a predetermined timing.

The transmitted check frame is received by the check-frame receiving unit 103 of the relay device 100 connected to the transmitting device (step S201). The reception determining unit 104 determines whether the receiving device belonging to the multicast group corresponding to the destination address of the check frame is under a control of the relay device 100 (step S202). If a target receiving device is not under a control of the relay device 100 (No at step S202), the received check frame is discarded (step S211). Therefore, unnecessary check frame is not relayed, resulting in preventing a waste of the bandwidth.

If there is the receiving device belonging to the multicast group under a control of the relay device 100 (Yes at step S202), the check frame is output to the duplicating unit 105 and the bandwidth-data extracting unit 107. The bandwidth-data extracting unit 107 extracts the bandwidth data of the check frame, and acquires the received bandwidth that is stored by the transmitting device and received as the check frame (step S203). The received bandwidth acquired is output with the destination MAC address of the check frame to the bandwidth comparing unit 109.

On the other hand, when the check frame is output to the duplicating unit 105, the duplicating unit 105 duplicates the check frames as many number of the devices connected to the relay device 100. The check-frame transmitting unit 106 transmits the duplicated check frames to each of the nodes (step S204). The receiving device belonging to the multicast group corresponding to the destination address or the relay device that controls the receiving device receives the check frames transmitted in the above manner.

When the received bandwidth and the destination MAC address are output to the bandwidth comparing unit 109 at the same time of the relay of the check frame, the bandwidth comparing unit 109 reads out the preset bandwidth previously stored in the bandwidth storing unit 108, in association with the destination MAC address (step S205). The bandwidth comparing unit 109 compares the received bandwidth with the preset bandwidth (step S206), and notifies a comparison result whether the received bandwidth and the preset bandwidth are consistent, to the result determining unit 301.

When the comparison result obtained by the bandwidth comparing unit 109 indicates that the received bandwidth and the preset bandwidth are consistent (Yes at step S206), the result determining unit 301 does not issue an instruction for generating the response frame. When the comparison result obtained by the bandwidth comparing unit 109 indicates that the received bandwidth and the preset bandwidth are inconsistent (No at step S206), the instruction for generating the response frame is issued to the response-frame generating unit 110. In other words, when the received bandwidth and the preset bandwidth are inconsistent, the result determining unit 301 issues the instruction for generating the response frame indicating that the comparison result is "inconsistent", to the response-frame generating unit 110, in addition to the received bandwidth and the preset bandwidth.

The response-frame generating unit 110 sets the bandwidth comparison result to be "inconsistent" (step S208), and generates the response frame (step S701). In other words, the address of the transmitting device is set to be the destination address, while the address of the relay device 100 is set to be the source address. The bandwidth comparison result indicating the "inconsistency", the received bandwidth, and the preset bandwidth are stored as the bandwidth-comparison data field, so that the response frame is generated.

The response frame generated in the above manner is output to the response-frame transmitting unit 113, and is transmitted from the response-frame transmitting unit 113 to the transmitting device specified by the destination address or a relay device located between the relay device 100 and the transmitting device (step S702).

An operation of a return of the response frame according to the third embodiment is performed by the relay device in which the bandwidth inconsistency is detected, from among the relay devices that receive the check frame, and the transmitting device receives the response frame exclusively from the relay device of which bandwidth is inconsistent. Therefore, the transmitting device can easily determine that relay device causes the degradation of the throughput due to the bandwidth inconsistency. The response frame is not transmitted from the relay devices of which bandwidths are consistent, so that it is possible to reduce a usage of the bandwidth in the entire communication system.

As described above, according to the third embodiment, the response frame containing the bandwidth comparison result is returned from the relay device in which the received bandwidth and the preset bandwidth are inconsistent, in response to the check frame transmitted from the transmitting device in multicast. Therefore, the transmitting device can easily determine whether the bandwidth inconsistency occurred in each of the relay devices located between the transmitting device and the receiving device, resulting in easily identifying a cause of the degradation of the throughput. The size of the response frame transmitted in the communication system can be reduced, resulting in reducing the usage of the bandwidth in the entire communication system.

Figure 14:
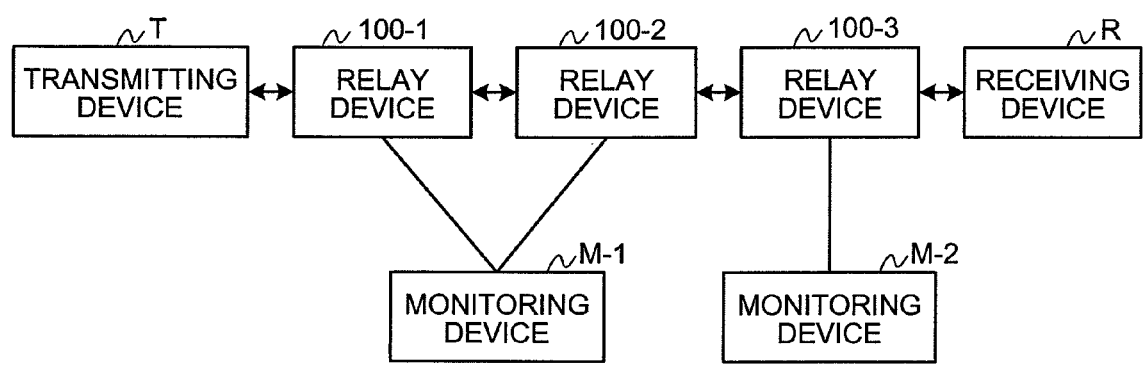
FIG. 14 is a schematic diagram for explaining a communication system according to an embodiment of the present invention.

According to the first to the third embodiments, it is acceptable to provide a monitoring device that manages the relay devices in the same VWAN, so that, when the bandwidth inconsistency is detected in each of the relay devices, an alarm signal notifying the inconsistency is transmitted to the monitoring device. A general configuration of the communication system in the above case is shown in FIG. 14. In the communication system shown in FIG. 14, a monitoring device M-1 is connected to the relay devices 100-1 and 100-2 in the same VWAN, and a monitoring device M-2 is connected to the relay device 100-3, from among the relay devices 100-1 to 100-3.

In such communication system, if the received bandwidth and the preset bandwidth are inconsistent in the relay device 100-1, the alarm signal indicating that the bandwidth inconsistency occurred is transmitted to the monitoring device M-1. If the received bandwidth and the preset bandwidth are inconsistent in the relay device 100-3, the alarm signal is transmitted to the monitoring device M-2. In this case, the response frame and the check frame can be generated and transmitted in the same manner described in to the first to the third embodiments.

Although all the relay devices return the response frame according to the first embodiment, and the relay device with the bandwidth inconsistent exclusively returns the response frame according to the third embodiment, it is possible for the transmitting device to select a relay device that returns the response frame. In other words, it is possible to store option data indicating that all the relay devices return the response frame (option "0") or that the relay device with the inconsistent bandwidth exclusively returns the response frame (option "1"), as the bandwidth data field of the check frame to be transmitted from the transmitting device in multicast, so that each of the relay devices can determine whether to return the response frame by referring to the option data of the check frame.

It is also possible to set the option data indicating that the response frame is returned after the relay device having the inconsistent bandwidth performs an automatic recovery (option "2"). Accordingly, the relay device that received such option returns the response frame after performing the automatic recovery for adjusting the bandwidth of the target device to the received bandwidth.

If the relay device, in which a setting is performed for not responding to the check frame, is included in the system, it is possible to set a bit of response state data in the bandwidth-comparison data field of the response frame. In this case, a bit (e.g., "1") indicating "respond" is stored as the response state data in the relay device that responds in a normal manner, while a bit (e.g., "0") indicating "not respond" is stored as the response state data in the relay device that does not respond. The relay device containing the bit indicating the "not respond" as the response state data generates the response frame without storing the received bandwidth and the preset bandwidth in the bandwidth-comparison data field.

According to an aspect of the present invention, if the received bandwidth received by the first frame and the preset bandwidth previously stored in the own device are inconsistent, the inconsistency can be notified to the transmitting device and the receiving device using the second frame. Accordingly, it is possible to determine whether the bandwidths are consistent in each of the relay devices. As a result, it is possible to easily identify a cause of the degradation of the throughput, due to the bandwidth inconsistency.

Furthermore, according to an aspect of the present invention, it is possible to determine whether the set bandwidth of the relay device is not excessively wide nor excessively narrow, so that it is possible to determine that the bandwidths are inconsistent when two set bandwidths are not identical.

Moreover, according to an aspect of the present invention, the transmitting device and the receiving device that receive the second frame can check the two set bandwidths to be compared, in addition to the comparison result.

Furthermore, according to an aspect of the present invention, each of the relay devices can compare the set bandwidth with the preset bandwidth in the transmitting device, so that it is possible to assuredly detect a wrong setting of the preset bandwidth.

Moreover, according to an aspect of the present invention, each of the relay devices can compare the set bandwidth with the preset bandwidth in a device that directly transmits and receives the frame, so that it is possible to detect whether the bandwidths are inconsistent between the devices connected to the own device.

Furthermore, according to an aspect of the present invention, the consistency and the bandwidth inconsistency in each of the relay devices are notified to the transmitting device, so that the transmitting device can easily identify the relay devices of which bandwidths are inconsistent.

Moreover, according to an aspect of the present invention, the transmitting device, the relay device, and the receiving device can check the comparison result of the set bandwidth in a previous node.

Furthermore, according to an aspect of the present invention, it is possible to generate the second frame containing the data on consistency/inconsistency of the bandwidths in each of the relay devices, so that it is possible to check the consistency/inconsistency of the bandwidths in each of the relay devices using a single frame.

Moreover, according to an aspect of the present invention, it is possible to easily identify the cause of the degradation of the throughput, due to the bandwidth inconsistency, even when the set bandwidths for an upstream communication and a downstream communication are different from each other.

Furthermore, according to an aspect of the present invention, it is possible to reduce the size of the second frame to be transmitted in the communication system, so that it is possible to reduce the usage of the bandwidth in the entire communication system.

Moreover, according to an aspect of the present invention, it is possible to notify the bandwidth inconsistency to the monitoring device that monitors the relay device, so that it is possible to more promptly correct the set bandwidth.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus that relays a communication between a transmitting device and a receiving device, the apparatus comprising:
    a receiving unit that receives a first frame containing a first bandwidth allocated to the communication;
    an acquiring unit that acquires the first bandwidth contained in the first frame received by the receiving unit;
    a comparing unit that compares the first bandwidth acquired by the acquiring unit with a second bandwidth previously set in the apparatus to determine whether the first bandwidth and the second bandwidth are consistent or not;
    a generating unit that generates a second frame containing the first bandwidth, the second bandwidth, and inconsistency information indicating an occurrence of a bandwidth inconsistency, when the first bandwidth and the second bandwidth are determined not to be consistent by the comparing unit; and
    a transmitting unit that transmits the second frame generated by the generating unit.

2. The apparatus according to claim 1, wherein the generating unit generates the second frame containing consistency information indicating an occurrence of a bandwidth consistency when the first bandwidth and the second bandwidth are determined to be consistent by the comparing unit.

3. The apparatus according to claim 1, wherein the generating unit embeds the first bandwidth and the second bandwidth in the second frame, after the comparing unit compares the first bandwidth with the second bandwidth.

4. The apparatus according to claim 1, wherein the receiving unit receives a check frame containing the first bandwidth embedded by the transmitting device, transmitted from the transmitting device in multicast.

5. The apparatus according to claim 1, wherein the receiving unit receives the first frame containing the first bandwidth set in a device connected to the apparatus.

6. The apparatus according to claim 1, wherein the generating unit generates a response frame to be addressed to the transmitting device.

7. The apparatus according to claim 1, wherein the generating unit generates the second frame to be addressed to a device connected to the apparatus.

8. The apparatus according to claim 1, wherein
    the receiving unit receives the first frame containing a bandwidth comparison result in addition to the first bandwidth from a device connected to the apparatus, and
    the generating unit generates the second frame by adding the inconsistency information to the bandwidth comparison result embedded in the first frame received by the receiving unit.

9. The apparatus according to claim 1, wherein the comparing unit compares the first bandwidth with the second bandwidth for each of a communication from the transmitting device to the receiving device and a communication from the receiving device to the transmitting device.

10. The apparatus according to claim 1, wherein the generating unit generates the second frame, only when the first bandwidth and the second bandwidth are determined not to be consistent by the comparing unit.

11. The apparatus according to claim 1, further comprising a notifying unit that issues an alarm indicating an occurrence of a bandwidth inconsistency, when the first bandwidth and the second bandwidth are determined not to be consistent by the comparing unit.

12. An communication-path managing method for an apparatus that relays a communication between a transmitting device and a receiving device, the method comprising:

receiving a first frame containing a first bandwidth allocated to the communication;

acquiring the first bandwidth contained in the first frame received at the receiving;

comparing the first bandwidth acquired at the acquiring with a second bandwidth previously set in the apparatus to determine whether the first bandwidth and the second bandwidth are consistent or not;

generating a second frame containing the first bandwidth, the second bandwidth, and inconsistency information indicating an occurrence of a bandwidth inconsistency, when the first bandwidth and the second bandwidth are determined not to be consistent at the comparing; and transmitting the second frame generated at the generating.

* * * * *